United States Patent
Zavalishin et al.

(10) Patent No.: US 11,481,873 B2
(45) Date of Patent: Oct. 25, 2022

(54) METHOD AND APPARATUS FOR IMAGE PROCESSING

(71) Applicant: Samsung Electronics Co., Ltd., Suwon-si (KR)

(72) Inventors: Sergey Stanislavovich Zavalishin, Moscow (RU); Aleksei Mikhailovich Gruzdev, Moscow (RU); Kirill Viktorovich Lebedev, Nizhniy Novgorod (RU); Evgeny Andreevich Dorokhov, Moscow (RU); Ilya Vasilievich Kurilin, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 16/987,850

(22) Filed: Aug. 7, 2020

(65) Prior Publication Data
US 2021/0042881 A1 Feb. 11, 2021

(30) Foreign Application Priority Data
Aug. 9, 2019 (RU) .......................... RU2019125328

(51) Int. Cl.
*G06T 3/40* (2006.01)
*G06T 5/00* (2006.01)

(52) U.S. Cl.
CPC .......... *G06T 3/4015* (2013.01); *G06T 3/4007* (2013.01); *G06T 5/002* (2013.01); *G06T 2207/10024* (2013.01)

(58) Field of Classification Search
CPC ..... G06T 3/4007; G06T 3/4015; G06T 5/002; G06T 2207/10024
See application file for complete search history.

(56) References Cited

U.S. PATENT DOCUMENTS

| 7,990,447 B2 | 8/2011 | Honda et al. |
| 9,665,948 B2 | 5/2017 | Lin et al. |

(Continued)

FOREIGN PATENT DOCUMENTS

RU 2014138087 A 4/2016

OTHER PUBLICATIONS

SafnaAsiq et al. ("Octa-Directional Residual Demosaicking Using Filtered Bayer Color Filter Array," Second International Conference on Intelligent Computing and Control Systems; Date of Conference: Jun. 14-15, 2018) (Year: 2018).*

(Continued)

*Primary Examiner* — Yubin Hung
(74) *Attorney, Agent, or Firm* — Jefferson IP Law, LLP

(57) ABSTRACT

An image processing method is provided The image processing includes images obtained using a Red-Clear-Clear-Blue (RCCB) color filter array. An image processing method for processing an RCCB image obtained by an image capturing device comprising an array of photosensors with a mosaic of RCCB filters comprises interpolating the RCCB image to obtain dense C-channel data from a sparse C-channel, and chromatic filtering, based on the RCCB image data and the dense C-channel, to obtain an RGB image by obtaining the dense R-channel and B-channel, and filtering the R-channel and B-channel using the guide image. The computational load on the image processing equipment and the processing time are reduced, while enhancing the obtained image quality, including in low light conditions.

20 Claims, 13 Drawing Sheets

(56) References Cited

U.S. PATENT DOCUMENTS

| | | | |
|---|---|---|---|
| 9,672,599 B2* | 6/2017 | Kim | H04N 9/04517 |
| 10,200,664 B2 | 2/2019 | Kaizu | |
| 2016/0093066 A1 | 3/2016 | Lin et al. | |
| 2016/0154151 A1* | 6/2016 | Cha | H04N 9/04 |
| | | | 359/353 |
| 2016/0300870 A1* | 10/2016 | Keelan | H01L 27/14649 |
| 2017/0048500 A1* | 2/2017 | Shi | H04N 9/646 |
| 2017/0161872 A1 | 6/2017 | Ma et al. | |
| 2017/0278224 A1 | 9/2017 | Onzon et al. | |
| 2018/0077397 A1 | 3/2018 | Eto | |
| 2018/0188427 A1* | 7/2018 | Brueckner | G02B 5/201 |
| 2019/0318451 A1* | 10/2019 | Swami | G06T 3/4015 |

OTHER PUBLICATIONS

Daisuke Kiku, "Minimized-Laplacian Residual Interpolation for Color Image Demosaicking".

Russian Notice of Allowance dated Nov. 29, 2019, issued in Russian Application No. 2019125328/08(049587).

\* cited by examiner 211
(One pixel photo Sensor)

FIG. 2B

```
SPARSE C-CHANNEL        DENSE C-CHANNEL
```

METHOD AND APPARATUS FOR IMAGE PROCESSING

CROSS-REFERENCE TO RELATED APPLICATION(S)

This application is based on and claims priority under 35 U.S.C. § 119(a) of a Russian patent application number 2019125328, filed on Aug. 9, 2019, in the Russian Federal Service for Intellectual Property, the disclosure of which is incorporated by reference herein in its entirety.

BACKGROUND

1. Field

The disclosure relates to a processing of images. More particularly, the disclosure relates to a processing of images obtained by using a Red-Clear-Clear-Blue (RCCB) color filter array.

2. Description of Related Art

Currently, image capturing devices (photo and video cameras, scanners, and the like) use photodetector arrays (photosensors) covered by a color filter array (CFA) or color filter mosaic (CFM)) transmitting light of a specific wavelength to capture and form a color image. Color filters are necessary because typical photosensors are approximately equally sensitive to all colors in the visible spectrum and, therefore, cannot separate color information. One of the most common color filters is a Bayer filter. The Bayer filter contains 25% red elements, 25% blue elements and 50% green elements arranged in a specific order and is also referred to as a Red-Green-Green-Blue (RGGB) filter array. Due to color filters, each pixel of a photodetector picks up only ⅓ of the color information, and ⅔ is cut off by the color filter. To obtain the remaining color components cut off by each pixel of the photodetector, color information obtained by neighboring pixels is used. To obtain a color image in one of the standard color spaces, a process called debayerization (demosaicing) is used. The debayerization (demosaicing) process is a process of interpolating colors for each pixel from raw Bayer data and is also a process of obtaining color information that has not been obtained by color filters in each pixel.

However, in low light conditions, the use of a Bayer filter may not be efficient enough, as each color filter cuts off a significant part (⅔) of the signal spectrum, which results in low signal energy received by the photodetector. As a result, the reconstructed color image has low quality and high noise.

To eliminate the above disadvantages in low light conditions, a Red-Clear-Clear-Blue (RCCB) filter can be used. The RCCB filter is similar to the Bayer filter, however, instead of green color filters used in the Bayer filter, the RCCB filter uses clear elements that pass almost the entire spectrum of the signal, i.e., no color components of radiation are cut off. Thus, the RCCB filter can help more energy to enter the photodetector in low light conditions. However, due to loss of G-channel (Green channel) information, additional processing of the information obtained by the photodetector array is required to reconstruct the color image. In addition, since due to presence of a C-channel (Clear channel) the matrix with the RCCB filter picks up more radiation energy than the matrix with the Bayer filter, the C-channel can be overexposed (saturated) under sufficient/excessive light conditions.

Thus, the matrix with the RCCB filter delivers higher signal-to-noise ratio in low light conditions in comparison with the matrix with the RGGB filter of the related art, and is of great assistance in such fields as automotive driving, video surveillance, robotics, human-computer interaction and the like. In this case, the RCCB image may be processed with demosaicing techniques of the related art, but requires additional treatment for proper scene colors restoration. The current demosaicing techniques compromise between equipment computational performance and image reconstruction quality. As a result, the demosaic algorithms of the related art lack real-time image high-quality processing on low-power SoC-based (System-on-Chip) equipment, such as smart-phones, tablets, and the like. In addition, the demosaicing techniques often neglect the C-channel saturation (overexposure) problem in sufficient light conditions, and the saturation compensation methods of the related art are vulnerable to large overexposed image areas or to two over-saturated color channels.

The above information is presented as background information only to assist with an understanding of the disclosure. No determination has been made, and no assertion is made, as to whether any of the above might be applicable as prior art with regard to the disclosure

SUMMARY

Aspects of the disclosure are to address at least the above-mentioned problems and/or disadvantages and to provide at least the advantages described below. Accordingly, an aspect of the disclosure is to provide the demosaicing techniques of the related art have a number of disadvantages, including: inability to simultaneously provide real-time performance (high processing speed) and high image quality, color and structural artifacts around edges and dense textures, color artifacts around overexposed regions, chromatic noise.

Thus, there is a need for creating a simple method for real-time processing of a captured image, not demanding high computational performance and providing high quality reconstructed color images in different light conditions.

According to an embodiment of the disclosure, an algorithm for a full-color red, green, blue (RGB) image reconstruction from a raw one formed by a Red-Clear-Clear-Blue (RCCB) filter is proposed.

Additional aspects will be set forth in part in the description which follows and, in part, will be apparent from the description, or may be learned by practice of the presented embodiments.

In accordance with an aspect of the disclosure, an image processing method is provided. The image processing method includes obtaining dense C-channel data from a sparse C (Clear)-channel by interpolating a raw RCCB image, obtaining a dense R (Red)-channel and B (Blue)-channel by performing chromatic filtration based on raw RCCB image data and the dense C-channel, and obtaining an RGB image by filtering the R-channel and the B-channel by using a guide image, wherein the obtaining of the dense C-channel data includes: obtaining a residual C-channel by using sparse C-channel data and the raw RCCB image, obtaining a difference between the C-channel and the R-channel and a difference between the C-channel and the B-channel based on previously obtained data, and obtaining the dense C-channel data based on the raw RCCB image and the difference between the C-channel and other channels.

In accordance with another aspect of the disclosure, an image processing apparatus is provided. The image processing apparatus includes an interpolation device configured to obtain dense C-channel data from a sparse C (Clear)-channel by interpolating a raw RCCB image, and a chromatic filtering device configured to obtain a dense R (Red)-channel and B (Blue)-channel by performing chromatic filtration based on raw RCCB image data and the dense C-channel, and obtain an RGB image by filtering the dense R-channel and B-channel by using a guide image, wherein the interpolation device is further configured to: obtain a residual C-channel by using sparse C-channel data and the raw RCCB image, obtain a difference between the C-channel and the R-channel and a difference between the C-channel and the B-channel based on previously obtained data, and obtain the dense C-channel data based on the raw RCCB image and the difference between the C-channel and other channels.

The disclosure provides for real-time processing of a captured RCCB image on low-power equipment, such as equipment at SoC-platform, for obtaining a full-color high-quality image and color channel saturation compensation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2B illustrates a sparse channel and a dense channel of a Red-Clear-Clear-Blue (RCCB) image according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the spirit and scope of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more such surfaces.

The functional connection of the elements should be understood as a connection that ensures the correct interaction of these elements with each other and implementation of one or another functionality of the elements. More particularly, examples of functional connection can be connection with the possibility of exchanging information, connection with the possibility of transmitting electric current, connection with the possibility of transmitting mechanical motion, connection with the possibility of transmitting light, sound, electromagnetic or mechanical vibrations, and the like. The specific type of functional connection is determined by the nature of interaction of the mentioned elements, and, unless otherwise specified, is provided by well-known means using principles well known in the art.

Figure 1:
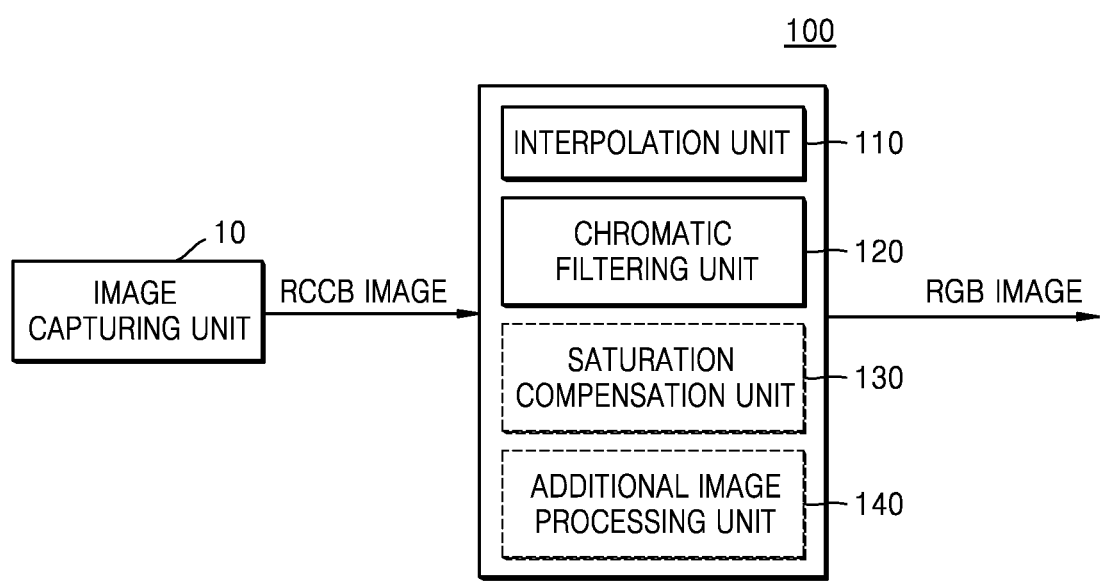
FIG. 1 illustrates an image processing apparatus according to an embodiment of the disclosure.

FIG. 1 illustrates an image processing apparatus according to an embodiment of the disclosure.

Referring to FIG. 1, an image processing apparatus 100 according to an embodiment of the disclosure includes an interpolation unit 110 and a chromatic filtering unit 120. The interpolation unit 110 interpolates a raw Red-Clear-Clear-Blue (RCCB) image to obtain dense C-channel data from a sparse C (clear)-channel. The chromatic filtering unit 120 obtains a dense R (Red)-channel and B (Blue)-channel by performing chromatic filtration based on the raw RCCB image data and the dense C-channel, and obtains an red, green, blue (RGB) image by filtering the dense R-channel and B-channel using a guide image.

The image processing apparatus 100 may further include a saturation compensation unit 130 adapted for detection and saturation compensation of saturated pixels in input image data. In addition, the image processing apparatus 100 may further include an additional image processing unit 140 adapted for restoring white balance and tone mapping. An RCCB image input to the image processing apparatus 100 may be obtained by an image capturing unit 10 included in the image processing apparatus 100 or located outside. The image capturing unit 10 includes an array of photosensors with a mosaic of color filters. Referring to FIG. 1, an operation of the image processing apparatus 100 of FIG. 1 will be described below.

Figure 2A:
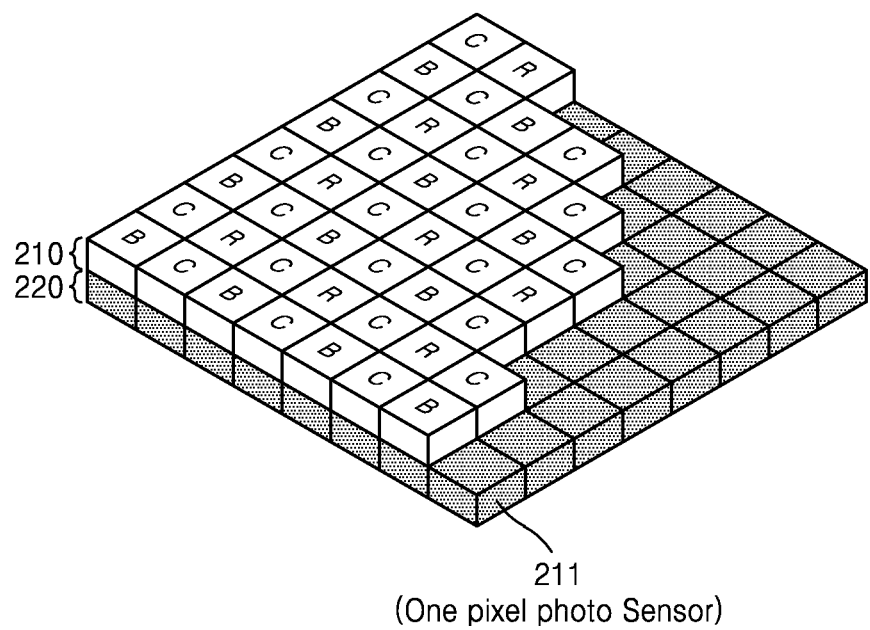
FIG. 2A illustrates an image capturing unit according to an embodiment of the disclosure.
Figure 2B:
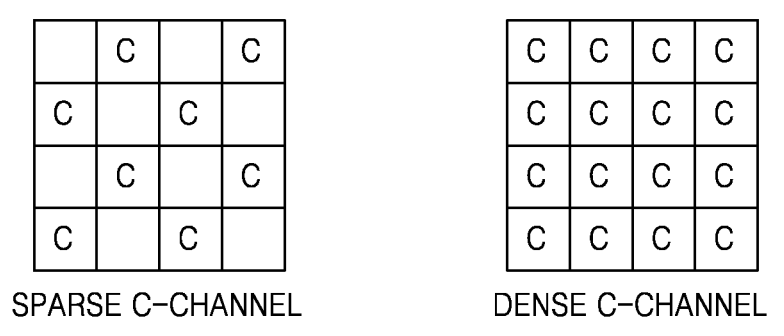

FIG. 2A illustrates an image capturing unit 10 according to an embodiment of the disclosure. FIG. 2B illustrates the sparse channel and the dense channel of the RCCB image according to an embodiment of the disclosure.

Referring to FIG. 2A, the image capturing unit 10 includes photosensors 220 and R (Red) filters, B (Blue) filters, and C (Clear) filters 210 located on the photosensors 220 in the mosaic form. In the raw RCCB image, one photosensor is covered by one of the R filter, the B filter, and the C filter. Thus, one pixel of the raw RCCB image includes only one of R-channel data, B-channel data, and C-channel data. As such, the color channel data of the image in which the intensities of all pixels of the matrix with the RCCB filter, except for the pixels corresponding to this channel, are equal to zero is defined as the sparse channel. Basically, before interpolation, all the raw RCCB images have a sparse C-channel, a sparse R-channel, and a sparse B-channel.

Referring to FIG. 2B, in the raw RCCB image, C-channel data is obtained only by pixels covered by the C filters. The sparse C-channel is a representation of the color channel data in which the C-channel data is obtained only in the pixel in which the C filter is located, and the C-channel data is not obtained in the pixel in which the R filter or the B filter is located.

The dense channel is a representation of the color channel data of the image in which the values of the color channel intensities in the matrix pixels unknown in the RCCB image are reconstructed/calculated. Other channel data that are not obtained in each pixel may be calculated by using data of the current pixel and neighboring pixels.

Hereinafter, an image processing method according to the disclosure will be described.

Figure 3A:
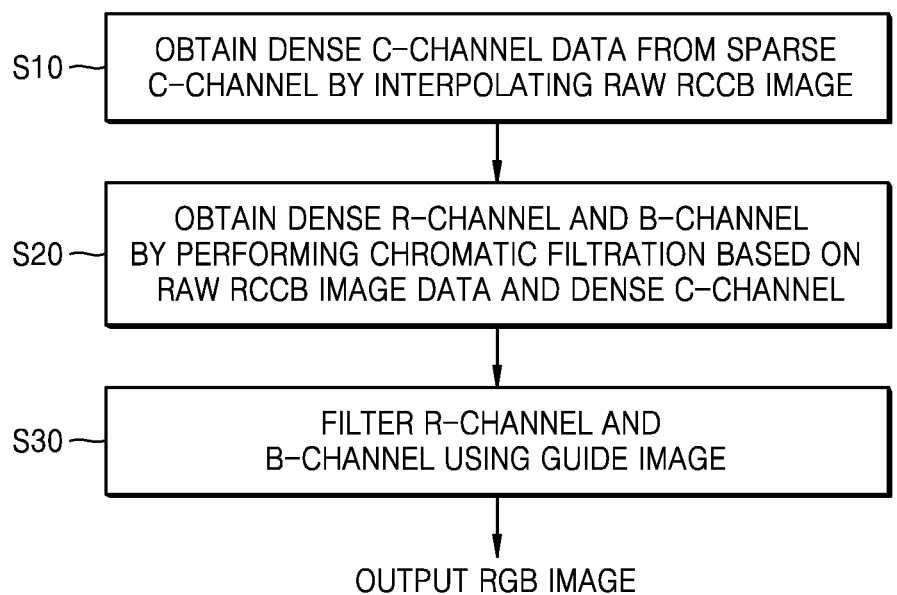
FIG. 3A illustrates an image processing method according to an embodiment of the disclosure.

FIG. 3A illustrates an image processing method according to an embodiment of the disclosure.

Referring to FIG. 3A, in operation S10, the interpolation unit 110 obtains dense C-channel data from a sparse C-channel by interpolating a raw RCCB image The interpolation unit 110 may obtain a residual C-channel by using sparse C-channel data and the raw RCCB image, may obtain a difference between a C-channel and an R-channel and a difference between a C-channel and a B-channel based on the previously obtained data, and may obtain the dense C-channel data based on the RCCB image and the difference between the C-channel and other channels. In operation S20, the chromatic filtering unit 120 obtains a dense R-channel and B-channel by performing chromatic filtration based on the raw RCCB image data and the dense C-channel, and in operation S30, the chromatic filtering unit 120 obtains an RGB image by filtering the R-channel and the B-channel by using a guide image.

Figure 3B:
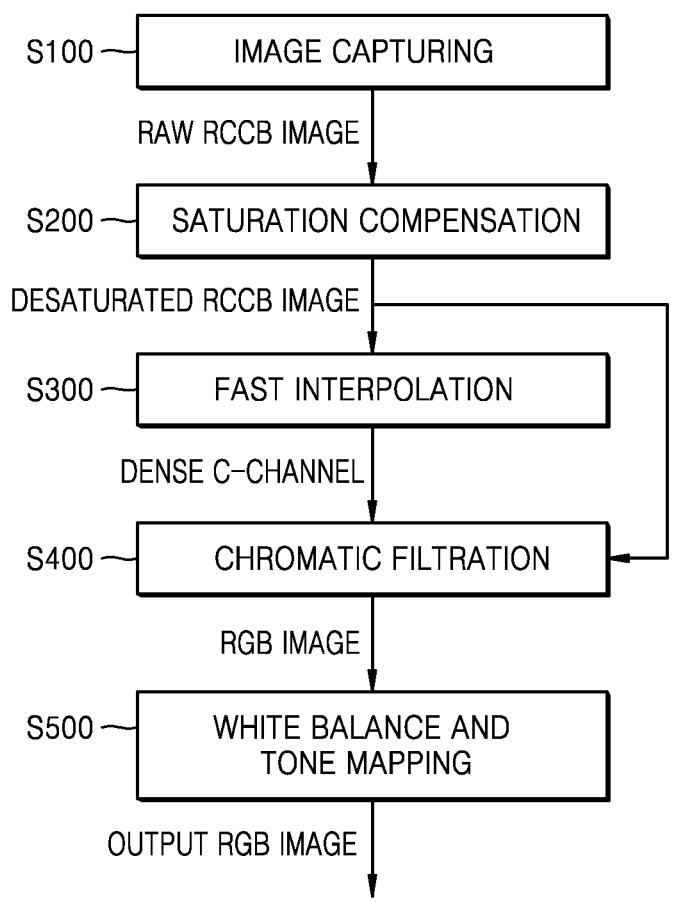
FIG. 3B illustrates an image processing method according to an embodiment of the disclosure.

FIG. 3B illustrates an image processing method according to an embodiment of the disclosure.

Referring to FIG. 3B, in operation S100, an image capturing process by an image capturing unit 10 including an array of photosensors with a mosaic of color filters may be performed. In this embodiment of the disclosure, an RCCB filter is used. The captured RAW-image of the RCCB is received by the saturation compensation unit 130. The saturation compensation unit 130 may perform saturation compensation (operation S200) on the overexposed regions. The saturation compensation process will be described below.

The RCCB image is received by the interpolation unit 110, where, in operation S300, a dense C-channel is reconstructed from a sparse C-channel. The RCCB image input to the interpolation unit 110 may be the raw RCCB image, or may be a desaturated RCCB image on which a desaturation process to be described below is performed when the saturated region is presenting the raw RCCB image. Operation S300 will be described below.

Operation S400 includes chromatic filtration, based on the dense C-channel data and the raw RCCB image, to obtain an RGB image. Operation S400 will be described below.

Operation S500 includes final processing of the obtained RGB image.

It is worthwhile mentioning that the image processing in operations S200-S500 can be performed both in the image processing apparatus 100 integrated with the image capturing unit 10 in a single device, and in the image processing apparatus 100 remote from the image capturing unit and implemented, for example, in a remote computer, server or cloud service. For example, the image capturing unit 10 and the image processing apparatus 100 may be implemented through one physical device, or may be implemented apart from each other.

Figure 4:
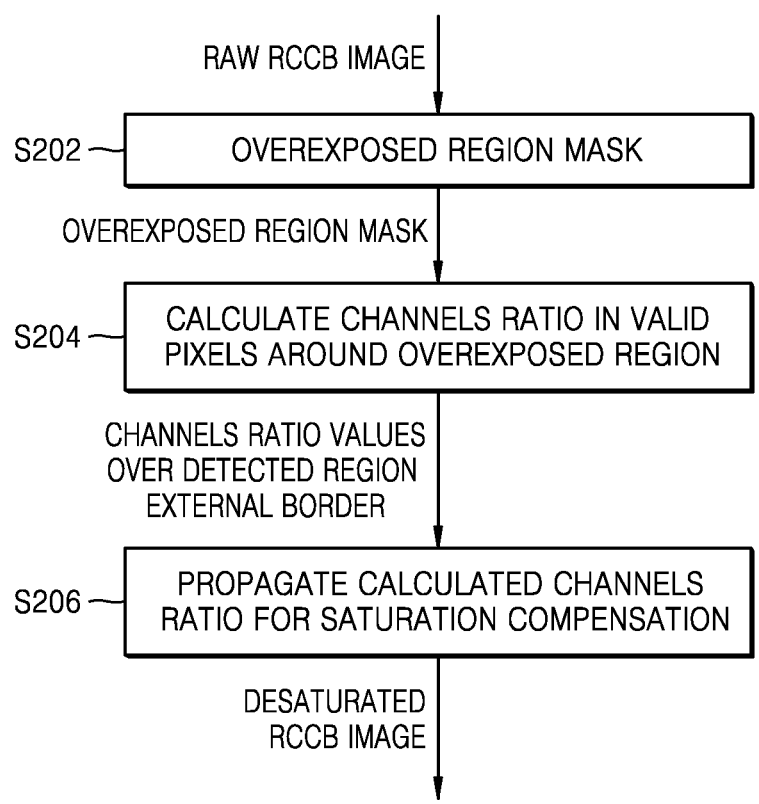
FIG. 4 illustrates a saturation compensation process in a captured image according to an embodiment of the disclosure.

The saturation compensation process in the captured image performed in operation S200, according to FIG. 3B is illustrated in FIG. 4.

FIG. 4 illustrates a saturation compensation process in a captured image according to an embodiment of the disclosure.

Referring to FIG. 4, the RAW image captured in operation S100 is received by the saturation compensation unit 130. In operation S202, the saturation compensation unit 130 detects the overexposed region in the captured image and generates a mask of the overexposed region. For this purpose, a downscaled red-clear-clear-blue (RCCB) image is formed from the captured RCCB image.

Figure 5:
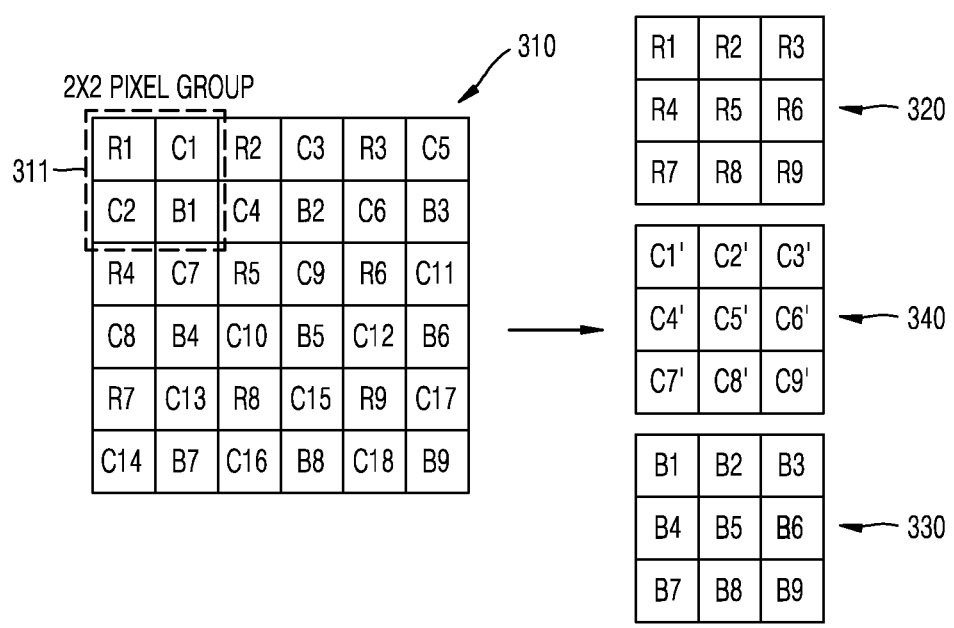
FIG. 5 illustrates a process of forming a downscaled red-clear-clear-blue (RCCB) image according to an embodiment of the disclosure.

FIG. 5 illustrates the process of forming a downscaled RCCB image according to an embodiment of the disclosure.

Referring to FIG. 5, the principle of generating a downscaled RCCB image is illustrated for a case of a 6×6 pixel matrix consisting of 3 columns and 3 rows of 2×2 pixel groups, each including RCCB pixels according to an embodiment of the disclosure. Three 3×3 pixel images 320, 330, and 340 are generated from the 6×6 pixel matrix 310 for each of the R-, C-, B-channels, in which the pixel values are sampled from each 2×2 pixel group of the 6×6 pixel matrix 310 that is the raw image. Similarly, three 512×512 pixel images are generated for each of the R-, C-, B-channels from an input RCCB image with a resolution of, for example, 1024×1024.

When forming a downscaled RCCB image, the pixel values for the R- and B-channels are set in one-to-one correspondence with the corresponding pixels of the R- and B-channels of the raw RCCB image. For example, because one 2×2 pixel group 311 includes a pixel of one R-channel, a pixel of one B-channel, and pixels of two C-channels, the pixel of the R-channel included in the 2×2 pixel group 311 is in one-to-one correspondence with the pixel of the R-channel 320 in the downscaled RCCB image, and the pixel of the B-channel included in the 2×2 pixel group 311 is also in one-to-one correspondence with the pixel of the B-channel 330 in the downscaled RCCB image. The pixel value for C-channel 340 of the downscaled RCCB image is set as an average of two adjacent pixels of the C-channel of the raw RCCB image, covered by one RCCB filter:

$$C_{avg}=0.5*(C1_{origin}+C2_{origin}),$$

where $C1_{origin}$ is the first pixel value of the C-channel in the RCCB image, and $C2_{origin}$ is the second pixel value of the C-channel in the RCCB image. For example, the average of two pixels C1 and C2 of the C-channel included in one 2×2 pixel group 311 is set as a pixel C1' of the downscaled C-channel 340.

To detect the overexposed region in the image, the following condition applies:

$$\widehat{D_k}=\{p_i^k:p_i^k>0.92*Q\}, \text{ where } k=\overline{1,M}, i=\overline{1,L_k},$$

where $\widehat{D_k}$—is the $k^{th}$ overexposed region, M is the number of overexposed regions in the image, the $k^{th}$ region consists of $L_k$ pixels, $p_i^k$ is the $i^{th}$ pixel in the $k^{th}$ region, wherein if the intensity value in the $p_i^k$ pixel exceeds 0.92 of the maximum possible quantization Q value of the matrix of the image capturing unit, it may be determined that the pixel is damaged. For example, when it is assumed that a 12-bit signal is generated by the camera, the maximum possible quantization Q value of the matrix of the image capturing unit 10 is 4095 ($4095=2^{12}-1$). In an alternative embodiment of the disclosure, when the camera generates an 8-bit signal, $Q=255$ ($255=2^8-1$). In this case, a factor of 0.92 corresponds to a value of 92%, which is a threshold value for identifying damaged pixels. Whether a pixel is determined as an overexposed pixel may be changed according to the intensity value exceeding the Q value.

In the event that no overexposed regions are detected in the image, the method proceeds to operation S300.

It should be noted that in this embodiment of the disclosure, the overexposure is only in the C-channel, since the C-channel picks up a significantly larger amount of radiation energy in comparison with the R-channel and B-channel, as it was described above. For saturation compensation in the overexposed region, it is necessary to restore the signal value in the C-channel based on the R-channel (or B-channel) data, which is a guide channel. The R-channel, as a rule, contains more energy than the B-channel, therefore, the R-channel is taken as a guide to reconstruct the C-channel. To determine the possibility of making the R-channel a guide one, the R-channel is checked for overexposure according to the criterion described above, before reconstruction of the C-channel. If the R-channel is overexposed, then the B-channel is checked for overexposure. If the B-channel is not overexposed, then the R-channel is first reconstructed according to the B-channel. It should be noted that the B-channel becomes overexposed rarely. Therefore, at least one of the R-channel or the B-channel may be used as a guide for reconstruction of the C-channel.

In operation S204, the saturation compensation unit 130 calculates the channels ratio values in the valid pixels around (at the border of) the overexposed region according to the formula:

$$\text{ratio}_j^k=X_j^k/Y_j^k,$$

$$\text{ratio}_{min}^k=\min\{\text{ratio}_j^k\},$$

$$\text{ratio}_{max}^k=\max\{\text{ratio}_j^k\},$$

where $k=\overline{1,M}$, $j=\overline{1,T_k}$, wherein M is the number of overexposed regions, $T_k$ pixels are arranged at the border of the $k^{th}$ overexposed region, $X_j^k$ is the signal intensity of the overexposed channel (C-channel) of the $j^{th}$ pixel at the border of the $k^{th}$ region, $Y_j^k$ is the signal intensity of a valid (guide) channel of the $j^{th}$ pixel at the border of the $k^{th}$ region, $\text{ratio}_j^k$ is the corresponding ratio, $\text{ratio}_{min}^k$ is the minimum channels ratio at the border of the $k^{th}$ region, $\text{ratio}_{max}^k$ is the maximum channels ratio at the border of the $k^{th}$ region.

Then, in operation S206, the calculated values of the channels ratio in the valid pixels are propagated throughout the overexposed region, as described below.

$p_i^k$ means the $i^{th}$ overexposed pixel in the $k^{th}$ overexposed region, $\hat{p}_n^i$ is the $n^{th}$ pixel adjacent to $p_i^k$ (where n≤4) with the channels ratio of $\widehat{\text{ratio}}_n^i$, wherein $\hat{p}_n^i$ may be a pixel of the valid region, i.e., the $j^{th}$ pixel at the border of the overexposed region, having the ratio of $\text{ratio}_j^k$, as described above, or a pixel reconstructed in the previous operation. Then the channels ratio in the $p_i^k$ pixel is restored according to the expression:

$$\text{ratio}_i^k = \sum_{n=1}^{s}\varepsilon_n \cdot \widehat{\text{ratio}}_n^i + \varepsilon \cdot \text{ratio}_{min}^k + \varepsilon \cdot \text{ratio}_{max}^k, \text{ where}$$

$$\varepsilon_n = \frac{dist_{in}}{\sum_{n=1}^{s}dist_{in}},$$

$$dist_{in} = |I_i - I_n|,$$

$$\varepsilon = 0,01 \cdot \varepsilon_{min},$$

$$s \leq 4,$$

wherein $\text{ratio}_{min}^k$ and $\text{ratio}_{max}^k$ are the minimum and maximum values of the channels ratio at the border of the $k^{th}$ overexposed region, and $I_i$ is the intensity of the guide channel of the $i^{th}$ pixel in the $k^{th}$ region, s is the number of neighboring pixels considered (in this case s≤4, i.e., maximum 4 pixels—above, below, to the left and to the right of the $i^{th}$ pixel are considered), $\widehat{\text{ratio}}_n^i$ and $I_n$ are the channels ratio and intensity value of the guide channel of the $n^{th}$ neighboring pixel, $\varepsilon_n$ is weight with which the channels ratio of the $n^{th}$ neighboring pixel is included in the sum, $\varepsilon_{min}$ is the minimum weight in neighboring pixels, $dist_{in}$ is the intensity difference in the $i^{th}$ and $n^{th}$ pixels.

The restored channels ratio $\text{ratio}_i^k$ is then used to estimate the ratio in the overexposed pixels adjacent to $p_i^k$.

The calculated channels ratio $\text{ratio}_i^k$ the $p_i^k$ pixel is then used to obtain a compensated signal value of the overexposed channel in the overexposed pixel according to the expression:

$$X_i^k=\text{ratio}_i^k * Y_i^k,$$

where $X_i^k$ is the compensated signal value of the overexposed channel of the $i^{th}$ pixel in the $k^{th}$ region, $Y_i^k$ is the signal value of the guide channel of the $i^{th}$ pixel in the $k^{th}$ region.

Figure 6:
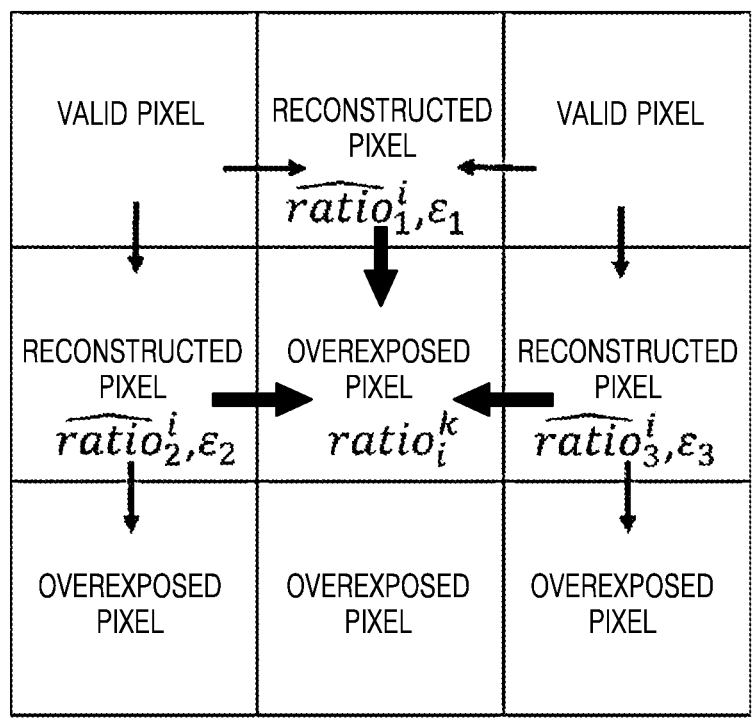
FIG. 6 illustrates an operation of a process of step-by-step restoration of a pixel value in a overexposed region according to an embodiment of the disclosure.

FIG. 6 illustrates an operation of a process of step-by-step restoration of a pixel value in a overexposed region according to an embodiment of the disclosure.

In this way, the entire overexposed region is treated for saturation compensation. One of the operations of the process of step-by-step restoration of a pixel value in a overexposed region using the calculated channels ratio is illustrated in FIG. 6 according to an embodiment of the disclosure.

The above-described operation of saturation compensation allows restoring the intensity values of the overexposed channel in the overexposed region in the presence of even one valid channel in the region. This, more particularly, allows increasing robustness to incorrectly selected camera exposition settings, the result of which is over-saturation. The mentioned operation is performed in one pass, is fast and simple, and it does not require significant computational performance. Therefore, the saturation compensation method according to the disclosure can be performed in real time in SoC platform-based equipment.

Referring to FIG. 6 illustrates the operation of a process of step-by-step restoration of a pixel value in an overexposed region using the calculated channels ratio at the border of the overexposed region. The processing direction of the overexposed pixel in the disclosure may be determined by the location of the overexposed pixel and the location of the non-overexposed correct pixels. For example, the processing of the overexposed pixel may begin from the border of the overexposed region found earlier. The neighborhood of each correct pixel (4 neighboring pixels) is considered and the overexposed pixels are added to the queue. The queue is a data structure with a sort key. The queue is initialized by the border of the damaged region.

To control the calculation order of the channels ratio for a pixel, the data array structure is represented by a queue with the following sort key:

$$\text{sort\_key}_{i,n} = \frac{dist_{in}}{I_i \sqrt{hit_i}},$$

where $hit_i \leq 4$ is the number of neighboring pixels involved in the $i^{th}$ pixel estimation.

The sort key determines the order in which the elements are processed. For example, when the next element is removed from the queue, an element with the lowest key value may be automatically selected. Processing continues until the queue is empty.

In an embodiment of the disclosure, four or more neighboring pixels located up, down, left, and right are considered for the $i^{th}$ pixel estimation. For example, when the $i^{th}$ pixel currently processed is predicted, up to four neighboring pixels located up, down, left, and right may be used. What specific pixels are involved in the current pixel estimation is determined according to the location of the overexposed region. In an alternative embodiment of the disclosure, up to eight neighboring pixels can be used, which can further enhance the quality of the obtained image, but affects the process performance.

Then, a desaturated RCCB image is formed from the desaturated RCCB image data. The R- and B-channels of the RCCB image are uniquely formed from the R- and B-channels of the reduced RCCB image (i.e., in the same way that the R- and B-channels of the RCCB image were formed from the RCCB image). The C-channel pixel values of the RCCB image are set as follows:

$$C1 = C1_{origin} * \text{ratio} * k1, \text{ where}$$

$$k1 = \frac{Q}{\text{maximum}(C1_{origin} * \text{ratio})}$$

$$C2 = C2_{origin} * \text{ratio} * k2, \text{ where}$$

$$k2 = \frac{Q}{\text{maximum}(C2_{origin} * \text{ratio})}$$

$$\text{ratio} = C_{restored}/C_{avg},$$

where maximum( . . . ) is a maximum value for all pixels, $C_{restored}$ is the restored C-channel pixel value in the downscaled image.

The obtained desaturated RCCB image data is transmitted further to the interpolation unit 110.

It is worth noting that in one embodiment of the disclosure, the saturation compensation operation S200 is optional and may be omitted. More particularly, but not exclusively, operation S200 may be omitted in accordance with the user's control input, predefined settings and/or under conditions ensuring absence of over-saturation in the captured image.

Figure 7:
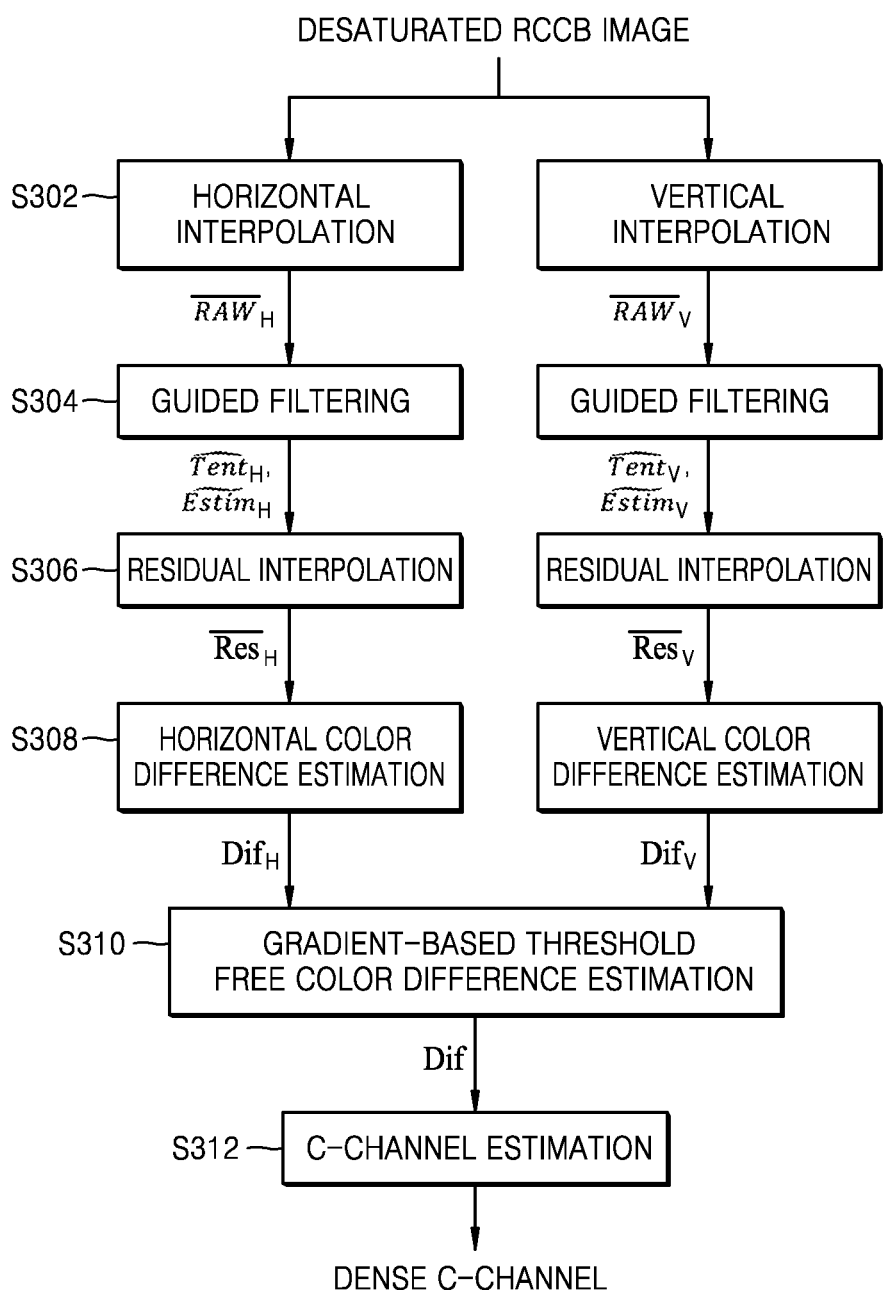
FIG. 7 schematically illustrates a fast interpolation process performed in operation S300 according to an embodiment of the disclosure.
Figure 8:
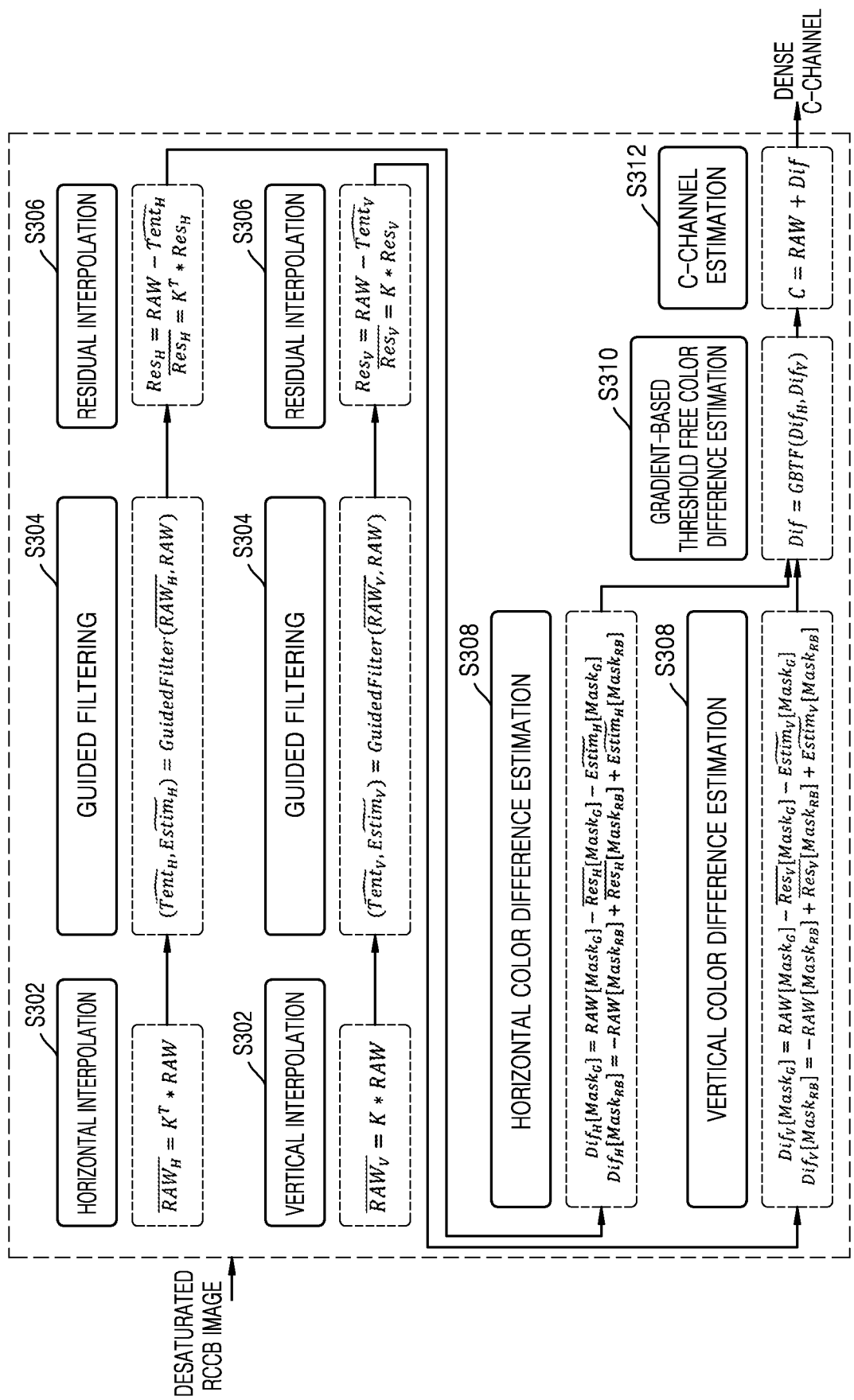
FIG. 8 is a mathematical representation of a processing performed in operation S300 according to an embodiment of the disclosure.
Figure 9:
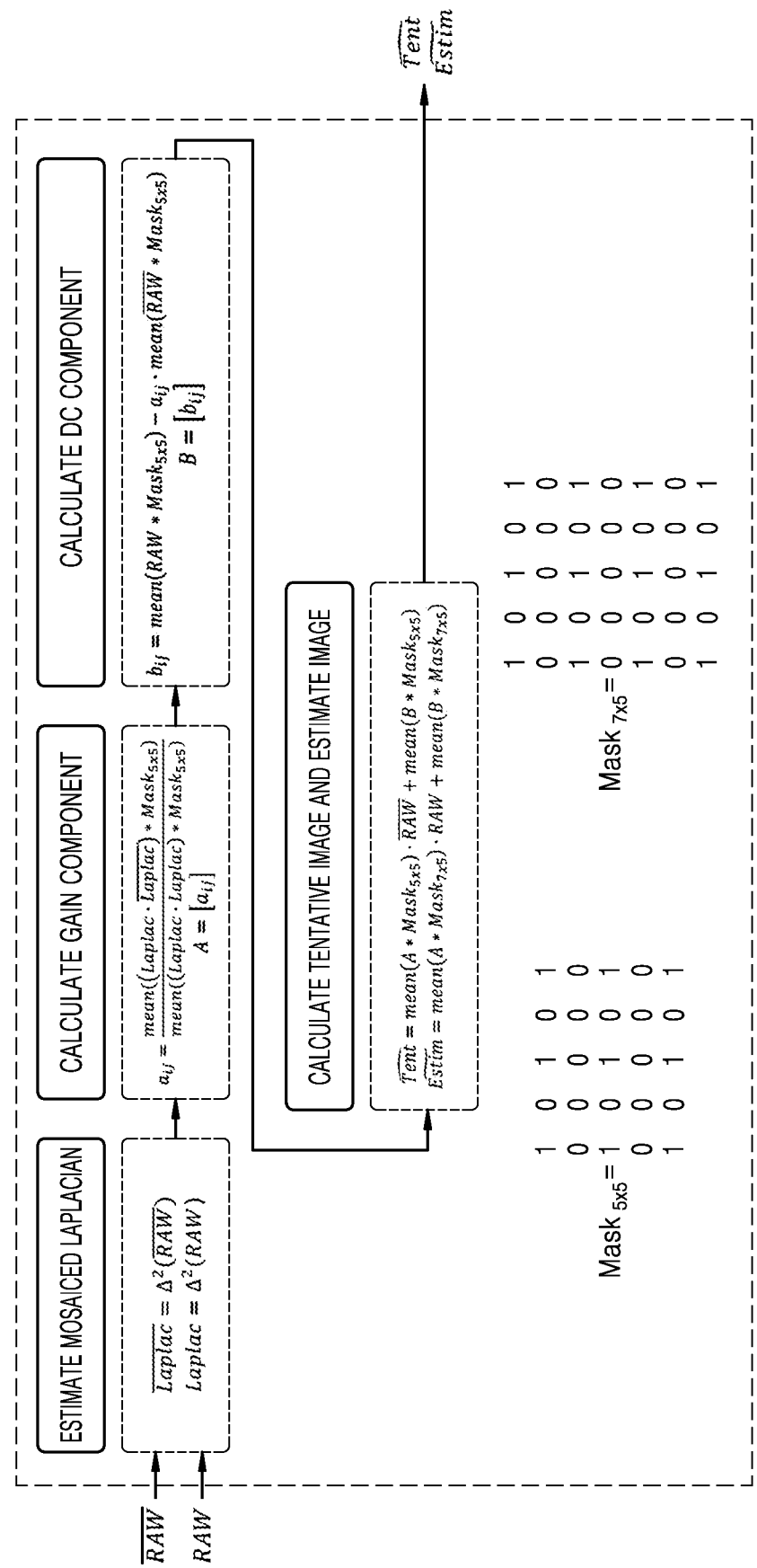
FIG. 9 illustrates a guided filtering process performed in operation S304 according to an embodiment of the disclosure.

Next, with reference to FIGS. 7, 8 and 9, operation S300 is described which is performed in an interpolation unit 110 to reconstruct a dense C-channel from a sparse C-channel according to various embodiments of the disclosure. As described above, a sparse channel is a representation of the color channel data of the image in which the intensities of all pixels of the matrix with the RCCB filter, except for the pixels corresponding to this channel, are equal to zero. A dense channel is a representation of the color channel data of the image in which the values of the color channel intensities unknown in the RCCB image in the matrix pixels are restored/calculated.

FIG. 7 schematically depicts a fast interpolation process performed in operation S300 according to an embodiment of the disclosure.

FIG. 8 is a mathematical representation of an processing performed in operation S300 according to an embodiment of the disclosure.

Referring to FIGS. 7 and 8, in operation S302, the signal value in the C-channel is horizontally and vertically interpolated in accordance with the expressions:

$$\overline{RAW}_H = K^T * RAW,$$

$$\overline{RAW}_V = K * RAW,$$

where K=(½, 0, ½), RAW is an RCCB raw mosaic (image), $\overline{RAW}_H$ is a horizontally interpolated mosaic, $\overline{RAW}_V$ is a vertically interpolated mosaic.

Next, in operation S304, the obtained interpolated signal values in the C-channel are used as a guide in guided filtering. The guided filtering process will be described below. As a result of performing operation S304, a tentative image and an estimate image containing smooth channels are obtained according to the expressions:

$$(\widetilde{Tent}_H, \widetilde{Estim}_H) = \text{GuidedFilter}(\overline{RAW}_H, RAW),$$

$$(\widetilde{Tent}_V, \widetilde{Estim}_V) = \text{GuidedFilter}(\overline{RAW}_V, RAW),$$

where $\widetilde{Tent}_H$ is a horizontally calculated tentative image, $\widetilde{Tent}_V$ is a vertically calculated tentative image, $\widetilde{Estim}_H$ is a horizontally calculated estimate image, $\widetilde{Estim}_V$ is a vertically calculated estimate image, GuidedFilter is a guided filtering function.

The tentative image and the estimate image are the intermediate data containing values from the R-, B-, C-channels, to which a smoothing filter is applied.

Operation S306 includes interpolating the residual values of the C-channel signal obtained by subtracting the calculated tentative image from the raw RCCB image according to the expressions:

$$Res_H = RAW - \widetilde{Tent}_H,$$

$$\overline{Res}_H = K^T * Res_H,$$

$Res_V = RAW - \widetilde{Tent}_V$, $\overline{Res_V} = K * Res_V$, where $Res_H$ is a horizontally calculated residual image, $Res_V$ is a vertically calculated residual image, $\overline{Res_H}$ is a horizontally calculated and horizontally interpolated residual image, $\overline{Res_V}$ is a vertically calculated and vertically interpolated residual image.

Next, in operation S308, based on the previously obtained data, the color difference is horizontally and vertically estimated between the C-channel and the R-, B-channels according to the expressions:

$Dif_H[Mask_C] = RAW[Mask_C] - \overline{Res_H}$
$[Mask_C] - e\,\widetilde{stim}_H[Mask_C]$, $Dif_H[Mask_{RB}] = -RAW[Mask_{RB}] + \overline{Res_H}[Mask_{RB}] + E\,\widetilde{stim}_H[Mask_{RB}]$, $Dif_V[Mask_C] = RAW[Mask_C] - \overline{Res_V}[Mask_C] - E\,\widetilde{stim}_V[Mask_C]$, $Dif_V[Mask_{RB}] = -RAW[Mask_{RB}] + \overline{Res_V}[Mask_{RB}] + E\,\widetilde{stim}_V[Mask_{RB}]$, where $Mask_C$ is a CFA mask of C-pixels, $Mask_{RB}$ is a color filter array (CFA) mask of red and blue pixels, $Dif_H$ is a horizontally calculated color difference, $Dif_V$ is a vertically calculated color difference, $X[Mask_C]$ a binary mask sampling from some image X, the mask corresponds to the pixels of the C-channel in the mosaic. For example, in C positions, $Mask_C$ has a value of 1, and in the rest positions, $Mask_C$ has a value of 0. $X[Mask_{RB}]$ is sampling of a binary mask corresponding to the pixels of the R- and B-channel in the RCCB mosaic. A[mask]=B[mask]+C[mask] means that A=B+C only for the binary mask pixels (where there is 1).

$Dif_H = Dif_H[Mask_C] + Dif_H[Mask_{RB}]$, $Dif_V = Dif_V[Mask_C] + Dif_V[Mask_{RB}]$, where $Mask_C + Mask_{RB}$ is a matrix of units having a dimension equal to the dimension of the image.

$Dif_H$ contains the difference between the C-channel and the horizontally interpolated R-channel in the C1 pixel, the difference between the C-channel and the horizontally interpolated B-channel in the C2 pixel, the difference between the horizontally interpolated C-channel and the R-channel in the R-pixel, the difference between the horizontally interpolated C-channel and the B-channel in the B-pixel. R, C1, C2, and B correspond to pixels according to the RCCB filter included in the 2×2 pixel group 311.

The obtained color difference value is used in operation S310 to perform gradient based threshold free color difference estimation according to the expression:

$Dif = GBTF(Dif_H, Dif_V)$, where Dif is the full color difference, and GBTF (Gradient Based Threshold Free) is a gradient-based threshold free estimation function.

The previously calculated $Dif_H$, $Dif_V$ can be used directly to restore the signal values in pixels, but the image quality will not be high enough. The GBTF operation calculates the weights with which the color differences in C1 and C2 pixels will be accumulated and allows to restore more accurately the C1, C2 values by taking into account local gradients.

In operation S312, the dense C-channel is reconstructed based on the previously obtained data as follows:

$C = RAW + Dif$, where C is a reconstructed dense C-channel.

FIG. 9 illustrates a guided filtering process performed in operation S304 according to an embodiment of the disclosure.

Referring to FIG. 9, in operation S304, the Laplacian is determined for the RCCB raw mosaic (image) (RAW) and the interpolated mosaic ($\overline{RAW}$) according to the expressions:

$\overline{Laplac} = \Delta^2(\overline{RAW})$, $Laplac = \Delta^2(RAW)$, where Laplac is a raw mosaic Laplacian, and $\overline{Laplac}$ is an interpolated mosaic Laplacian.

Next, a gain component is calculated according to the expressions:

$$a_{ij} = \frac{\text{mean}((Laplac * \overline{Laplac}) * Mask_{5\times5})}{\text{mean}((Laplac * Laplac) * Mask_{5\times5})},$$

$A = [a_{ij}]$, where mean is an average value sampling operation in the neighborhood of 5×5 around the pixel with coordinates (i, j), $Mask_{5\times5}$ is the 5×5 matrix, $a_{ij}$ is the matrix coefficient, A is the matrix of $a_{ij}$ coefficients, wherein the matrix dimension is equal to the image dimension.

Then the DC component (displacement component) is calculated according to the expressions:

$b_{ij} = \text{mean}(RAW * Mask_{5\times5}) - a_{ij} * \text{mean}(\overline{RAW} * Mask_{5\times5})$, $B = [b_{ij}]$, where $b_{ij}$ is the matrix coefficient, B is the matrix of $b_{ij}$ coefficients, wherein the matrix dimension is equal to the image dimension.

The $a_{ij}$ and $b_{ij}$ coefficients are the guided filtering linear model parameters.

Next, the tentative and estimate images are calculated according to the expressions:

$\widetilde{Tent} = \text{mean}(A * Mask_{5\times5}) * \overline{RAW} + \text{mean}(B * Mask_{5\times5})$, $\widetilde{Estim} = \text{mean}(A * Mask_{7\times5}) * RAW + \text{mean}(B * Mask_{7\times5})$, where $\widetilde{Tent}$ is a tentative image, $\widetilde{Estim}$ is an estimate image, $Mask_{7\times5}$ is a 7×5 matrix, wherein the $Mask_{5\times5}$ and $Mask_{7\times5}$ matrices have the form:

$$Mask_{5\times5} = \begin{matrix} 1 & 0 & 1 & 0 & 1 \\ 0 & 0 & 0 & 0 & 0 \\ 1 & 0 & 1 & 0 & 1 \\ 0 & 0 & 0 & 0 & 0 \\ 1 & 0 & 1 & 0 & 1 \end{matrix} \text{ and } Mask_{7\times5} = \begin{matrix} 1 & 0 & 1 & 0 & 1 \\ 0 & 0 & 0 & 0 & 0 \\ 1 & 0 & 1 & 0 & 1 \\ 0 & 0 & 0 & 0 & 0 \\ 1 & 0 & 1 & 0 & 1 \\ 0 & 0 & 0 & 0 & 0 \\ 1 & 0 & 1 & 0 & 1 \end{matrix}$$

The $Mask_{5\times5}$ and $Mask_{7\times5}$ masks are compiled in accordance with the RCCB filter so that the RCCB image can be processed directly, without processing separately the R-, C1-, C2-, B-channels, as it is in the Minimized-Laplacian Residual Interpolation (MLRI) algorithm.

Referring to FIG. 9, when processing an image in accordance with the disclosure, the guided filtering algorithm illustrated in FIG. 9 is performed twice in a horizontal-direction and a vertical direction. This is achieved by using the 5×5 and 7×5 masks described above. At the same time, when performing the MLRI known from the prior art, the guided filtering algorithm is performed 8 times: four times in the horizontal direction and four times in the vertical direction. Thus, the image processing method according to the disclosure can significantly reduce the processing time and the number of computational operations, while ensuring high quality of the obtained image.

Next, in operation S400, based on the obtained data of the dense C-channel and the desaturated RCCB image, chromatic filtration is performed to obtain an RGB image. Operation S400 will be described further with reference to FIGS. 10 and 11.

Figure 10:
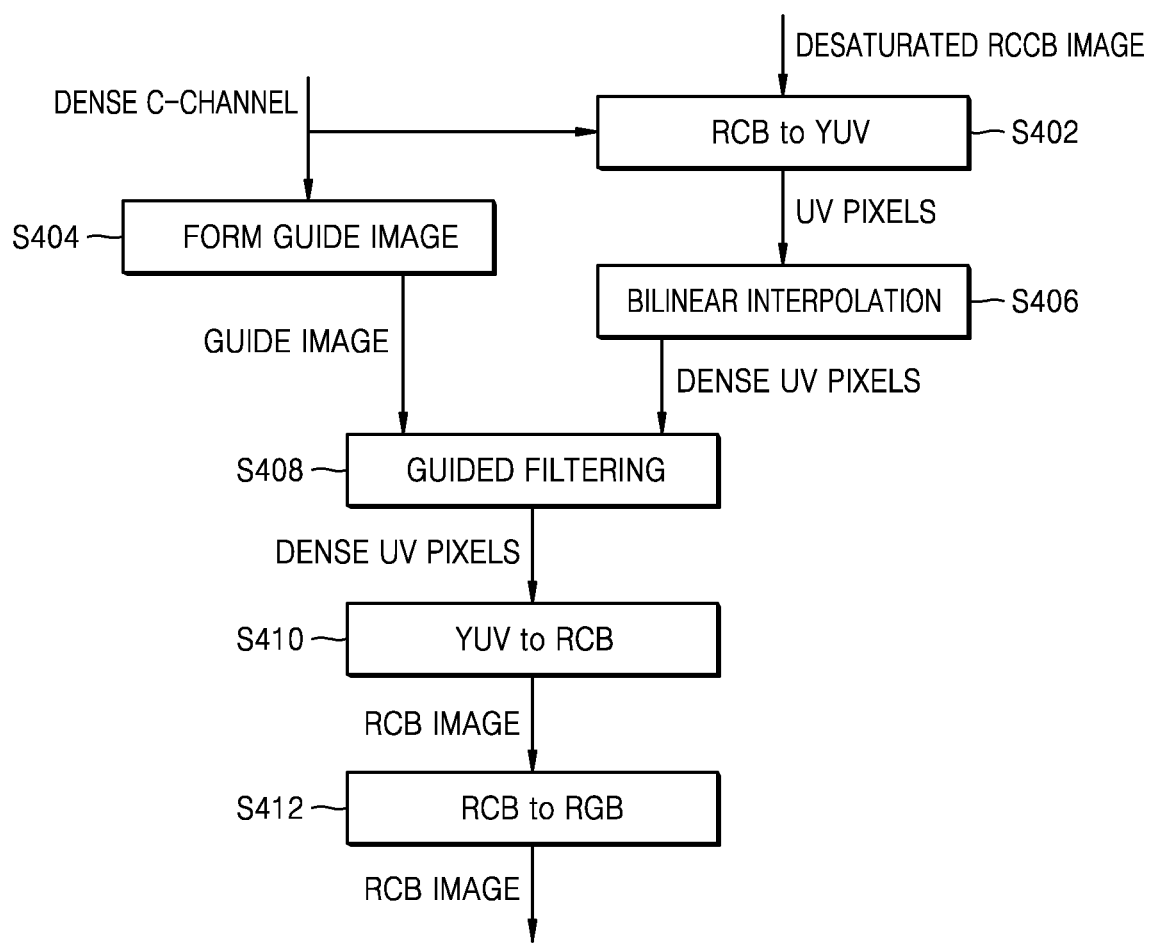
FIG. 10 schematically illustrates a chromatic filtration process performed in operation S400 according to an embodiment of the disclosure.

FIG. 10 schematically illustrates a chromatic filtration process performed in operation S400 according to an embodiment of the disclosure.

Figure 11:
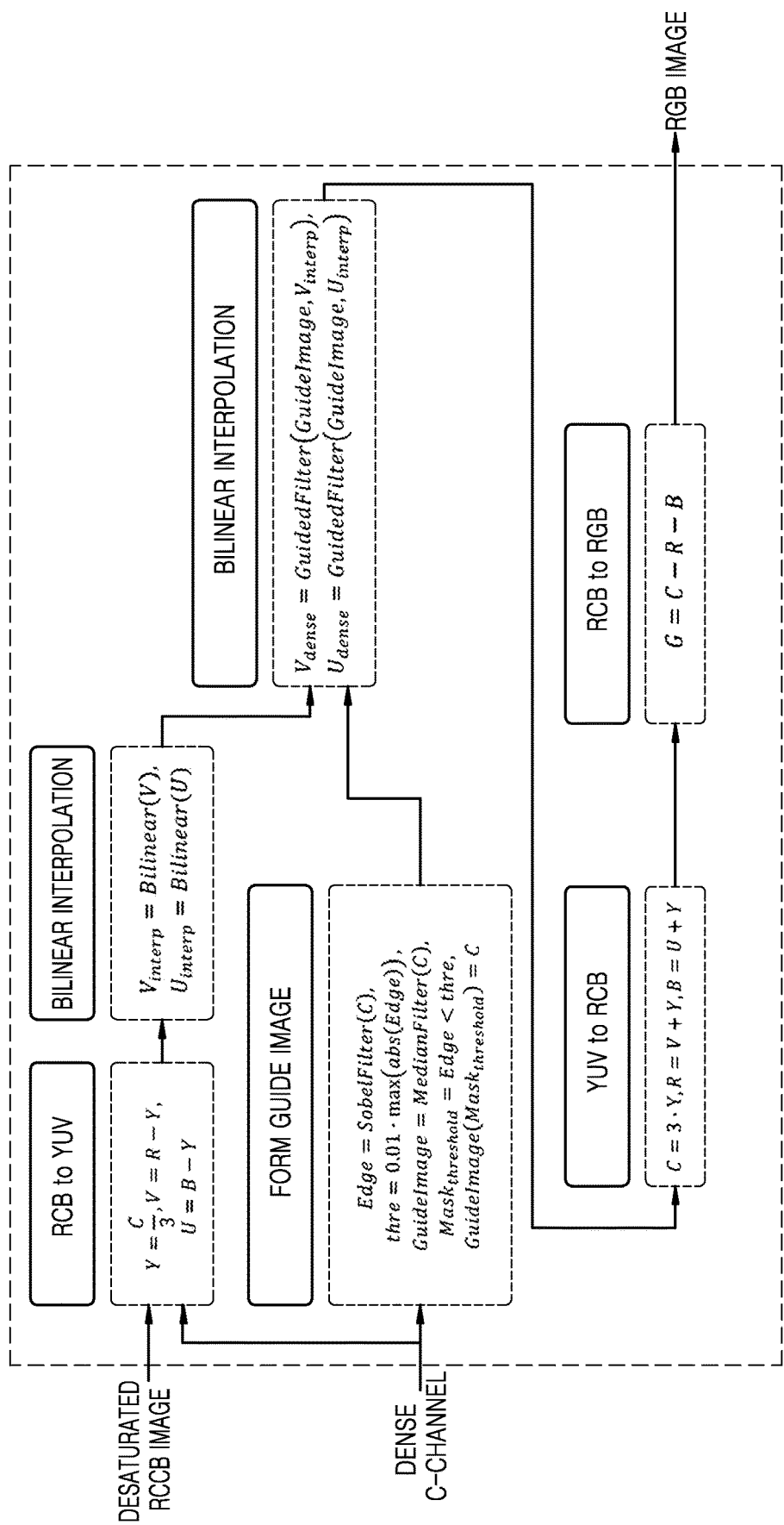
FIG. 11 illustrates a mathematical representation of a processing performed in operation S400 according to an embodiment of the disclosure.

FIG. 11 illustrates a mathematical representation of a processing performed in operation S400 according to an embodiment of the disclosure.

Referring to FIGS. 10 and 11, the chromatic filter performs reconstruction of the dense R-channel and B-channel and filtering of the R-channel and B-channel using a guide image. The filtering in the chromatic filtering process filters the R-channel and B-channel by using the dense C-channel as a guide image.

For this, in operation S402, based on the dense C-channel data and the desaturated RCCB image, the R-channel and B-channel data are mapped from the RCCB color model to the YUV color model according to the expressions:

$Y=C/3$, $V=R-Y$, $U=B-Y$, where Y is a brightness component, U, V are chromatic components, and R, B and C are signal values of the R, B and C channels in the corresponding pixel.

The use of the YUV color model makes it possible to isolate the luminance and chromatic components from the image and to perform more accurate filtering of the chromatic components.

Operation S404 includes forming a reference image based on the dense C-channel data according to the expressions:

Edge=SobelFilter(C), thre=0.01·max(abs(Edge)),

GuideImage=MedianFilter(C), $Mask_{threshold}$=Edge<thre,

GuideImage($Mask_{threshold}$)=C, where Edge is image borders, SobelFilter is a Sobel filter, abs is a module sampling operation, max is a maximum sampling operation, thre is a threshold value, MedianFilter is a median filter, $Mask_{threshold}$ is a mask of homogeneous regions, GuideImage is a guide image.

First, the borders are detected in the C-channel using the Sobel filter and the threshold value thre is calculated. Then, median filtering is applied to the C-channel regions in which the border value is less than thre (where the value is greater than thre, the raw C-channel values are stored accordingly).

Next, operation S406 includes bilinear interpolation of the values of the obtained U- and V-channels (chromatic components) to obtain dense pixels of the U- and V-channels according to the expressions:

$V_{interp}$=Bilinear(V), $U_{interp}$=Bilinear(U), where $V_{interp}$ is an interpolated V-channel, $U_{interp}$ is an interpolated U-channel, Bilinear is a bilinear interpolation.

Operation S408 includes guided filtering of the obtained dense U- and V-channels based on the guide image generated in operation S404, according to the expressions:

$V_{dense}$=GuidedFilter(GuideImage,$V_{interp}$), $U_{dense}$=GuidedFilter(GuideImage,$U_{interp}$), where GuidedFilter is a guided filtering operation, $V_{dense}$, $U_{dense}$ are dense chromatic components.

Guided filtering results in noise reduction in the chromatic components, and the U- and V-channels become matched with the C-channel.

Operation S410 includes the inverse mapping from the YUV color model to the RCCB color model according to the expressions:

$C=3·Y$, $R=V+Y$, $B=U+Y$.

And then, operation S412 includes mapping to an RGB color model to obtain an RGB image according to the expression:

$G=C-R-B$.

Thus, the chromatic filtering algorithm in accordance with the disclosure provides for obtaining interpolated (dense) R and B color channels and chromatic noise reduction.

It is worth while noting that in an alternative embodiment of the disclosure, the image processing described above can similarly be performed for an RGGB image captured by the image capturing unit matrix with a Bayer filter of the related art.

Operation S500 includes optional final processing of the obtained RGB image. This operation includes restoring the white balance, which is disturbed in processing the RAW image, and/or mapping a wide dynamic range of intensity values to the standard (Tone mapping).

According to another embodiment of the disclosure, there is provided a computer-readable medium storing a computer program which, when executed by a processor, causes the processor to execute the image processing method described above.

Obviously, when the matter concerns storing data, programs, and the like, the presence of a computer-readable storage medium is implied, examples of computer-readable storage media include read-only memory, random access memory, register, cache, semiconductor storage devices, magnetic media such as internal hard drives and removable drives, magneto-optical media and optical media such as compact disc read-only memory (CD-ROM)s and digital versatile disks (DVDs), as well as any other storage media known in the art.

The disclosure may find application in image capturing and processing devices, such as photo cameras and video cameras, including those embedded in SOC-based equipment (smartphones, tablets, digital video recorder (DVR)s, and the like). The ability to obtain good quality images both in low light conditions and in excessive light conditions provides advantages when using the disclosure in video surveillance systems, image capturing units in autonomous vehicles, augmented reality devices, and the like. Moreover, the disclosure provides real-time processing of the captured image even on low-power equipment with limited processing power.

The methods disclosed herein include one or more operations or actions to achieve the described method. The operations and/or actions of the method can replace each other without departing from the scope of the claims. In other words, unless a specific order of operations or actions is specified, the order and/or use of specific operations and/or actions can be changed without departing from the scope of the claims.

The application does not indicate specific software and hardware for implementation of the units in the drawings, but it will be obvious to a person skilled in the art that the essence of the disclosure is not limited to a specific software or hardware implementation, and therefore, any software and hardware known in the art can be used to implement the disclosure. So the hardware can be implemented in one or more specialized integrated circuits, digital signal processors, digital signal processing devices, programmable logic devices, user programmable gate arrays, processors, controllers, microcontrollers, microprocessors, electronic devices, and other electronic modules configured to perform the functions described in this document, a computer or a combination thereof.

Although embodiments have been described and shown in the accompanying drawings, it should be understood that such embodiments are merely illustrative and are not intended to limit the broader disclosure, and that the disclosure should not be limited to specific arrangements and structures shown and described, since various other modifications may be obvious to those skilled in the art.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An image processing method comprising:
   obtaining dense C-(Clear) channel data from a sparse C channel by interpolating a raw Red-Clear-Clear-Blue (RCCB) image;
   obtaining a dense R (Red)-channel and B (Blue)-channel by performing chromatic filtration based on data of the raw RCCB image and the dense C-channel; and
   obtaining an RGB image by filtering the dense R-channel and the dense B-channel by using a guide image,
   wherein the obtaining of the dense C-channel data comprises:
     obtaining a residual C-channel data by using the sparse C-channel data and the raw RCCB image;
     obtaining a difference between the sparse C-channel data of the raw RCCB image and interpolated R-channel data obtained by interpolating a sparse R-channel data of the raw RCCB image and a difference between the sparse C-channel data of the raw RCCB image and interpolated B-channel data obtained by interpolating a sparse B-channel data of the raw RCCB image; and
     obtaining the dense C-channel data based on the raw RCCB image and the obtained differences.

2. The image processing method of claim 1,
   wherein the residual C-channel data is obtained by performing horizontal and vertical interpolation of a signal value in the sparse C-channel data, obtaining a tentative image and an estimate image,
   and subtracting the tentative image from the raw RCCB image to obtain the residual C-channel data, and
   wherein the dense C-channel is obtained by obtaining full color difference based on the differences and summing the raw RCCB image with the full color difference.

3. The image processing method of claim 1,
   wherein the obtaining of the residual C-channel data further comprising:
     performing interpolation of a signal value in the sparse C-channel data and
     performing a guided filtering for the interpolation of the signal value in the sparse C-channel data, and
   wherein the performing of the guided filtering comprises:
     determining a Laplacian for the raw RCCB image (RAW) and an interpolated image ($\overline{\text{RAW}}$) according to the expressions:

$$\overline{\text{Laplac}} = \Delta^2(\overline{\text{RAW}}),$$

$$\text{Laplac} = \Delta^2(\text{RAW}),$$

and
where Laplac is a raw mosaic Laplacian, and $\overline{\text{Laplac}}$ is an interpolated mosaic Laplacian;
calculating a gain component according to the expressions:

$$a_{ij} = \frac{\text{mean}((Laplac * \overline{Laplac}) * \text{Mask}_{5\times5})}{\text{mean}((Laplac * Laplac) * \text{Mask}_{5\times5})},$$

$$A = [a_{ij}],$$

$A = [a_{ij}],$ where mean is an average value sampling operation in the neighborhood of 5×5 around the pixel with coordinates (i, j), $\text{Mask}_{5\times5}$ is the 5×5 matrix, $a_{ij}$ is the matrix coefficient, A is the matrix of $a_{ij}$ coefficients,
wherein the matrix dimension is equal to the image dimension;
calculating a DC component (displacement component) according to the expressions:

$$b_{ij} = \text{mean}(\text{RAW} * \text{Mask}_{5\times5}) - a_{ij} * \text{mean}(\overline{\text{RAW}} * \text{Mask}_{5\times5}),$$

$B = [b_{ij}],$ where $b_{ij}$ is the matrix coefficient, B is the matrix of $b_{ij}$ coefficients,
wherein the matrix dimension is equal to the image dimension, the $a_{ij}$ and $b_{ij}$ coefficients are a guided filtering linear model parameters; and
calculating a tentative image and an estimate image according to the expressions:

$$\widetilde{Tent} = \text{mean}(A * \text{Mask}_{5\times5}) * \overline{\text{RAW}} + \text{mean}(B * \text{Mask}_{5\times5}),$$

$$\widetilde{Estim} = \text{mean}(A * \text{Mask}_{7\times5}) * \text{RAW} + \text{mean}(B * \text{Mask}_{7\times5}),$$

where $\widetilde{Tent}$ is a tentative image, $\widetilde{Estim}$ is an estimate image, $\text{Mask}_{7\times5}$ is a 7×5 matrix, wherein the $\text{Mask}_{5\times5}$ and $\text{Mask}_{7\times5}$ matrices have the form:

$$\text{Mask}_{5\times5} = \begin{matrix} 1 & 0 & 1 & 0 & 1 \\ 1 & 0 & 1 & 0 & 1 \\ 0 & 0 & 0 & 0 & 0 \\ 1 & 0 & 1 & 0 & 1 \\ 0 & 0 & 0 & 0 & 0 \\ 1 & 0 & 1 & 0 & 1 \end{matrix} \text{ and } \text{Mask}_{7\times5} = \begin{matrix} 1 & 0 & 1 & 0 & 1 \\ 0 & 0 & 0 & 0 & 0 \\ 1 & 0 & 1 & 0 & 1 \\ 0 & 0 & 0 & 0 & 0 \\ 1 & 0 & 1 & 0 & 1 \\ 0 & 0 & 0 & 0 & 0 \\ 1 & 0 & 1 & 0 & 1 \end{matrix}.$$

4. The image processing method of claim 1, further comprising:
   determining whether an overexposed pixel of the sparse C-channel is present in the raw RCCB image; and
   when the overexposed pixel of the sparse C-channel is present, performing desaturation on the overexposed pixel of the sparse C-channel based on a signal intensity ratio value of a valid pixel between at least one of the R-channel or the B-channel in a valid pixel, which is not overexposed, and the C-channel.

5. The image processing method of claim 4, wherein the determining of whether the overexposed pixel of the C-channel is present comprises:
   mapping the raw RCCB image into a downscaled RCCB image, wherein pixel values for the R- and B-channels of the downscaled RCCB image are set in one-to-one correspondence with the corresponding pixels of the R- and B-channels of the raw RCCB image, and data for the C-channel of the downscaled RCCB image is set as an average of two adjacent pixels of the C-channel of the raw RCCB image; and
   determining, as the overexposed pixel, a pixel in which an intensity value in the downscaled RCCB image exceeds a certain threshold value.

6. The image processing method of claim 5, wherein the certain threshold value has 92% of a maximum possible quantization value Q of an image capturing unit matrix.

7. The image processing method of claim 4, wherein the performing of the desaturation on the overexposed pixel of the sparse C-channel comprises:
   calculating, in valid pixels at the border of the overexposed region, channel ratio values indicating overexposed C-channel signal intensity to valid guide channel (R- or B-channel) signal intensity ratio;
   propagating the channels ratio values in the valid pixels throughout the overexposed region to obtain desaturated channels ratio in the overexposed pixel; and
   obtaining a desaturated C-channel signal value in the overexposed pixel of the C-channel based on the guide channel signal intensity and the desaturated channels ratio.

8. The image processing method of claim 7, comprising calculating the overexposed C-channel signal intensity to the valid guide channel signal intensity ratio in the valid pixels at the border of the overexposed region according to the expressions:

$$\text{ratio}_j^k = X_j^k / Y_j^k,$$

$$\text{ratio}_{min}^k = \min\{\text{ratio}_j^k\},$$

$$\text{ratio}_{max}^k = \max\{\text{ratio}_j^k\},$$

where $k = \overline{1, M}$, $j = \overline{1, T_k}$,
wherein M is the number of overexposed regions, $T_k$ pixels are arranged at the border of the $k^{th}$ overexposed region, $X_j^k$ is the signal intensity of the overexposed channel of the $j^{th}$ pixel at the border of the $k^{th}$ region, $Y_j^k$ is the signal intensity of a valid channel of the $j^{th}$ pixel at the border of the $k^{th}$ region, $\text{ratio}_h^k$ is the corresponding ratio, $\text{ratio}_{min}^k$ is the minimum channels ratio at the border of the $k^{th}$ region, $\text{ratio}_{max}^k$ is the maximum channels ratio at the border of the $k^{th}$ region.

9. The image processing method of claim 8, comprising restoring the channels ratio in the overexposed $p_i^k$ pixel according to the expression:

$$\text{ratio}_i^k = \sum_{n=1}^{s} \varepsilon_n \cdot \widetilde{\text{ratio}}_n^i + \varepsilon \cdot \text{ratio}_{min}^k + \varepsilon \cdot \text{ratio}_{max}^k, \text{ where}$$

$$\varepsilon_n = \frac{\text{dist}_{in}}{\sum_{n=1}^{s} \text{dist}_{in}},$$

$$\text{dist}_{in} = |I_i - I_n|,$$

$$\varepsilon = 0,01 \cdot \varepsilon_{min},$$

$$s \leq 4,$$

wherein $\text{ratio}_{min}^k$ and $\text{ratio}_{max}^k$ are the minimum and maximum values of the channels ratio at the border of the $k^{th}$ overexposed region, and $I_i$ is the intensity of the guide channel of the $i^{th}$ pixel in the $k^{th}$ region, s is the number of neighboring pixels considered, $\widetilde{\text{ratio}}_n^i$ and $I_n$ are the channels ratio and intensity value of the guide channel of the $n^{th}$ neighboring pixel, $\varepsilon_n$ is weight with which the channels ratio of the $n^{th}$ neighboring pixel is included in the sum, $\varepsilon_{min}$ is the minimum weight in neighboring pixels, $\text{dist}_{in}$ is the intensity difference in the $i^{th}$ and $n^{th}$ pixels.

10. The image processing method of claim 9, comprising calculating the desaturated C-channel signal value in the overexposed pixel according to the expression:

$$X_i^k = \text{ratio}_i^k * Y_i^k,$$

where $X_i^k$ is the compensated signal value of the overexposed channel of the $i^{th}$ pixel in the $k^{th}$ region, $Y_i^k$ is the signal value of the guide channel of the $i^{th}$ pixel in the $k^{th}$ region.

11. The image processing method of claim 1, further comprising restoring white balance.

12. The image processing method of claim 1, further comprising performing tone mapping to map a dynamic range of intensity values to a standard.

13. The image processing method of claim 1, wherein the chromatic filtration comprises:
   mapping, based on the dense C-channel data and the raw RCCB image, the R-channel and B-channel data from the RCCB color model to the YUV color model;
   forming a guide image based on the dense C-channel data;
   performing bilinear interpolation of the values of the obtained U- and V-channels to obtain dense U- and V-channels;
   performing guided filtration of the dense U- and V-channels based on the guide image;
   inverse image mapping from the YUV color model to the RCCB color model; and
   mapping to the RGB color model to obtain an RGB image.

14. An image processing apparatus comprising:
at least one processor; and
a memory coupled to the at least one processor,
wherein the memory stores instructions that, when executed, cause the at least one processor to:
  obtain dense C (Clear)-channel data from a sparse C channel by interpolating a raw RCCB (Red-Clear-Clear-Blue (RCCB) image,
  obtain a dense R (Red)-channel and B (Blue)-channel by performing chromatic filtration based on data of the raw RCCB image and the dense C-channel, and
  obtain an RGB image by filtering the dense R-channel and the dense B-channel by using a guide image,
wherein the at least one processor is further configured to:
  obtain a residual C-channel data by using the sparse C-channel data and the raw RCCB image,
  obtain a difference between the sparse C-channel data of the raw RCCB image and interpolated R-channel data obtained by interpolating a sparse R-channel data of the raw RCCB image and a difference between the sparse C-channel data of the raw RCCB image and interpolated B-channel data obtained by interpolating a sparse B-channel data of the raw RCCB image, and
  obtain the dense C-channel data based on the raw RCCB image and the obtained differences.

15. The image processing apparatus of claim 14,
wherein the
residual C-channel data is obtained by performing horizontal and vertical interpolation of a signal value in the sparse C-channel data,
obtaining a tentative image and an estimate image, and
subtracting the tentative image from the raw RCCB image to obtain the residual C-channel data, and
wherein the dense C-channel is obtained by obtaining full color difference based on the differences and summing the raw RCCB image with the full color difference.

16. The image processing apparatus of claim 14,
wherein the at least one processor is further configured to:
  perform interpolation of a signal value in the sparse C-channel data and
  perform a guided filtering for the interpolation of the signal value in the sparse C-channel data, and
wherein the performing of the guided filtering comprises:
  determine a Laplacian for the raw RCCB image (RAW) and the interpolated image ($\overline{RAW}$) according to the expressions:

$\overline{Laplac} = \Delta^2(\overline{RAW})$, $Laplac = \Delta^2 (RAW)$, where Laplac is a raw mosaic Laplacian, and $\overline{Laplac}$ is an interpolated mosaic Laplacian;

calculate a gain component according to the expressions:

$$a_{ij} = \frac{\text{mean}((Laplac * \overline{Laplac}) * \text{Mask}_{5\times5})}{\text{mean}((Laplac * Laplac) * \text{Mask}_{5\times5})},$$

$A = [a_{ij}]$, where mean is an average value sampling operation in the neighborhood of 5×5 around the pixel with coordinates (i, j), $\text{Mask}_{5\times5}$ is the 5×5 matrix, $a_{ij}$ is the matrix coefficient, A is the matrix of $a_{ij}$ coefficients, wherein the matrix dimension is equal to the image dimension;

calculate a DC component (displacement component) according to the expressions:

$b_{ij}$=mean(RAW*$\text{Mask}_{5\times5}$)−$a_{ij}$*mean($\overline{RAW}$ * $\text{Mask}_{5\times5}$), $B=[b_{ij}]$, where $b_{ij}$ is the matrix coefficient, B is the matrix of $b_{ij}$ coefficients,
wherein the matrix dimension is equal to the image dimension, the $a_{ij}$ and $b_{ij}$ coefficients are the guided filtering linear model parameters; and
calculate a tentative image and an estimate image according to the expressions:

$\widetilde{Tent}$ =mean(A*$\text{Mask}_{5\times5}$)*$\overline{RAW}$+mean(B*$\text{Mask}_{5\times5}$), $\widetilde{Estim}$ =mean(A*$\text{Mask}_{7\times5}$)*RAW+mean(B*$\text{Mask}_{7\times5}$), where $\widetilde{Tent}$ is the tentative image, $\widetilde{Estim}$ is the estimate image, $\text{Mask}_{7\times5}$ is a 7×5 matrix, and
wherein the $\text{Mask}_{5\times5}$ and $\text{Mask}_{7\times5}$ matrices have the form:

$$\text{Mask}_{5\times5} = \begin{matrix} 1 & 0 & 1 & 0 & 1 \\ 0 & 0 & 0 & 0 & 0 \\ 1 & 0 & 1 & 0 & 1 \\ 0 & 0 & 0 & 0 & 0 \\ 1 & 0 & 1 & 0 & 1 \end{matrix} \text{ and } \text{Mask}_{7\times5} = \begin{matrix} 1 & 0 & 1 & 0 & 1 \\ 0 & 0 & 0 & 0 & 0 \\ 1 & 0 & 1 & 0 & 1 \\ 0 & 0 & 0 & 0 & 0 \\ 1 & 0 & 1 & 0 & 1 \\ 0 & 0 & 0 & 0 & 0 \\ 1 & 0 & 1 & 0 & 1 \end{matrix}.$$

17. The image processing apparatus of claim 14, wherein the at least one processor is further configured to detect and compensate saturation of a saturated pixel in the raw RCCB image.

18. The image processing apparatus of claim 14, wherein the at least one processor is further configured to obtain the raw RCCB image using an image capturing unit comprising an array of photosensors with a mosaic of RCCB filters.

19. The image processing apparatus of claim 14, wherein the at least one processor is further configured to restore white balance and/or perform tone mapping.

20. At least one non-transitory computer-readable recording medium having recorded thereon a program for executing the image processing method of claim 11.

* * * * *